Oct. 6, 1931.  W. S. YARROW  1,826,036
PROCESSING PLANT
Filed Feb. 18, 1930  6 Sheets-Sheet 1

Oct. 6, 1931.  W. S. YARROW  1,826,036
PROCESSING PLANT
Filed Feb. 18, 1930    6 Sheets-Sheet 3

Oct. 6, 1931.  W. S. YARROW  1,826,036
PROCESSING PLANT
Filed Feb. 18, 1930  6 Sheets-Sheet 4

Patented Oct. 6, 1931

1,826,036

UNITED STATES PATENT OFFICE

WILLIAM SYDNEY YARROW, OF HARROW, ENGLAND, ASSIGNOR TO CARRIER ENGINEERING COMPANY, LIMITED, OF LONDON, ENGLAND

PROCESSING PLANT

Application filed February 18, 1930, Serial No. 429,415, and in Great Britain November 4, 1929.

This invention relates to methods and apparatus for processing, that is to say to methods and apparatus of and for carrying goods through a chamber in which treatment is effected, as for example a heat treatment, and has for its object to provide improved means of traversing goods through the processing chamber whereby uniform treatment is obtained.

A method of processing according to the present invention consists in carrying the articles through a succession of vertical planes comprised in the chamber by passaging the articles by lateral displacement from one plane to the next after a predetermined period in each plane, and preferably the articles which have been processed are, according to the present invention, ejected by lateral displacement enforced as a result of displacing an article from the final vertical plane in the chamber.

Apparatus according to the present invention comprises in combination a chamber, a revolving member in the chamber having a plurality of channels parallel with the axis thereof, and means for passaging articles through the channels whereby the articles pass from one end of the chamber to the other.

The term article used herein is intended to cover the single specimen introduced into the chamber, or a batch which may be included in a foraminous cage or basket.

The apparatus according to the invention is particularly useful in dealing with articles which must not be agitated, for instance canned food products.

In the production of canned food products machines have already been proposed for processing the products on drums in containers of cylindrical form. Such apparatus is designed to deal with products in round cans which, generally speaking, are easily dealt with, for example, it is a simple matter to supply such cans by gravity feed to a processing cylinder through a labyrinthian chamber, the cylinder comprising an internal drum on the periphery of which the cans are received and carried, and comprising also an internal helical guide which on the rotation of the drum causes the cans to pass from one end of the cylinder to the other, whereon they pass through another labyrinthian chamber to a receiving system.

It has also been proposed to process canned food products in cans of oval or irregular shape by hand charging a quantity of the cans into an iron chamber which is known as a retort or autoclave, and to charge the chamber with steam. For this purpose the chamber has at the middle of its upper part an inlet, and the middle of its lower wall an outlet.

After the proper period of processing the retort is flooded and when the containers are cooled they are removed. Thereafter the retort is used again.

In dealing with containers, particularly oval cans, according to the invention agitation of the contents of the containers is entirely avoided, whilst in the case of cylindrical cans rolling is avoided and the articles can be dealt with in continuous procession, and further an equal treatment of all of the cans during the processing is obtained.

Apparatus according to the invention, broadly stated, comprises a chamber charged with a treating medium, e. g. steam, in which wheels revolve, each wheel being provided with an annulus of pockets for the reception by lateral displacement with regard to the wheel, of the articles, e. g. closured cans, the feeding of one article at each step of rotation of the wheels causing a displacement from each wheel to the next and ultimately to the outlet of an article so that each article does a complete revolution in each wheel before being discharged.

In order that the invention may be more clearly understood reference will now be made to the accompanying drawings which show by way of example a preferred form of construction for a machine designed to deal with food products packed in oval cans.

The term "can" is used in the specification for convenience of description only, and is considered to cover all forms of containers for foods, whether of metal or of glass, that is to say, glass containers with metal covers secured in place by a jointed locking ring, are included within the term can, so also are containers wholly of metal in which the lid is seamed or soldered on. Moreover the word can is applied to a container of whatever its shape, whether regular or irregular.

In the drawings:

Figs. 9 and 10 show in part longitudinal sectional elevation and in transverse sectional elevation respectively modified arrangements of the chamber construction hereafter referred to.

In the drawings like reference numerals designate the same or similar parts.

Figure 3:
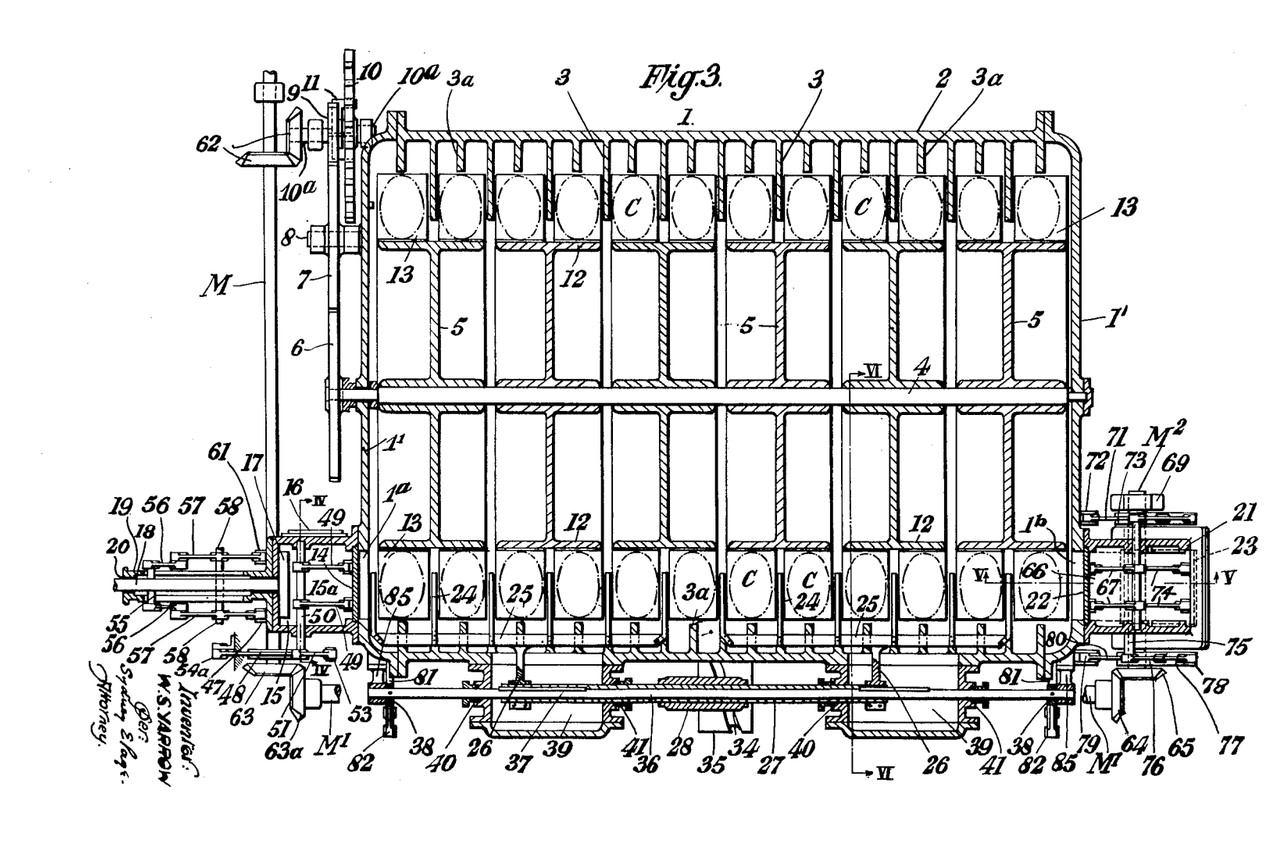
Fig. 3 is a sectional plan taken on the line III—III of Fig. 1.

The process chamber 1 in which the goods in the cans are to be cooked conveniently comprises end plates 1' connected by a tubular body 2 including integral annular ribs 3 spaced apart according to the width of a can C, and so that the can C is more or less snugly disposed between them, as clearly shown in Fig. 3 in which the cans C of oval form are indicated by chain lines.

The end plates 1' comprise bearings for a shaft 4 on which are keyed six wheels 5, the shaft 4 carrying a gear 6 in mesh with a gear 7 carried on a stub staft 8 conveniently supported on end plate 1' see Fig. 3, said gear 7 being also in mesh with a gear wheel 9 mounted on a short shaft 10a, said gear 9 being fixed to slotted gear 10, a pin roll 11 being mounted a stub shaft 11a see Fig. 7 supported below the short shaft 10a and is driven continuously through bevel gear 62 from the main shaft M. By such an arrangement the main shaft M is continuously rotating whilst the shaft 4 is only intermittently rotated through the agency of the Geneva stop mechanism 10 and 11.

By such an arrangement as the pin roll 11 engages in a slot of the gear 10 the gear is moved step by step, and in between the steps the gear 10 is locked by the roll member 11.

Figure 7:
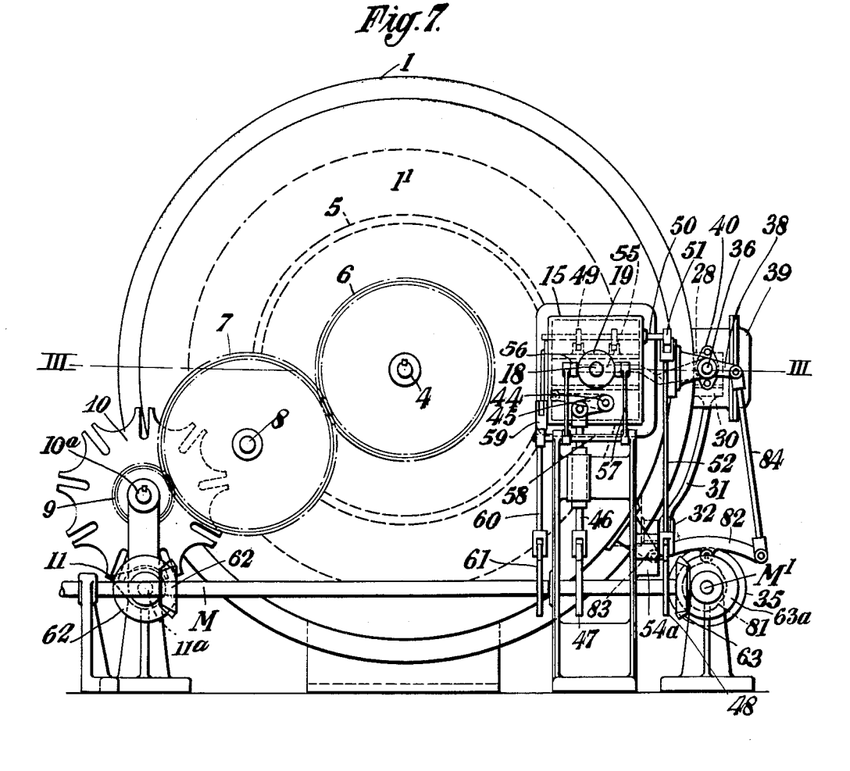
Fig. 7 is a side elevation showing the gearing for obtaining intermittent drive and locking of the wheels in the process chamber.
Figure 8:
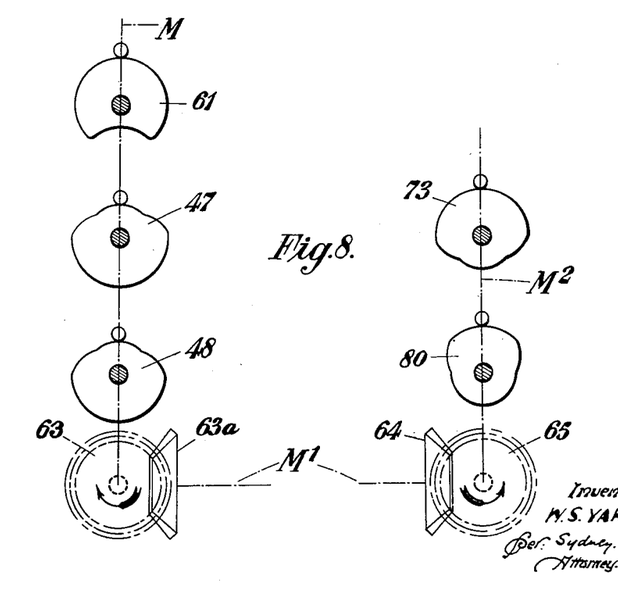
Fig. 8 diagrammatically illustrates the timing of the mechanism for feeding the cans to the locks and for regulating movement of the lock gates.

The arrangement of the gears 6, 7, 8 and 9 and the Geneva stop mechanism will be clearly understood by reference to Fig. 7 in which the roll 11 is shown entering a slot in the gear member 10 immediately prior to the gear member 10 being rotated by the roll 11.

Figure 6:
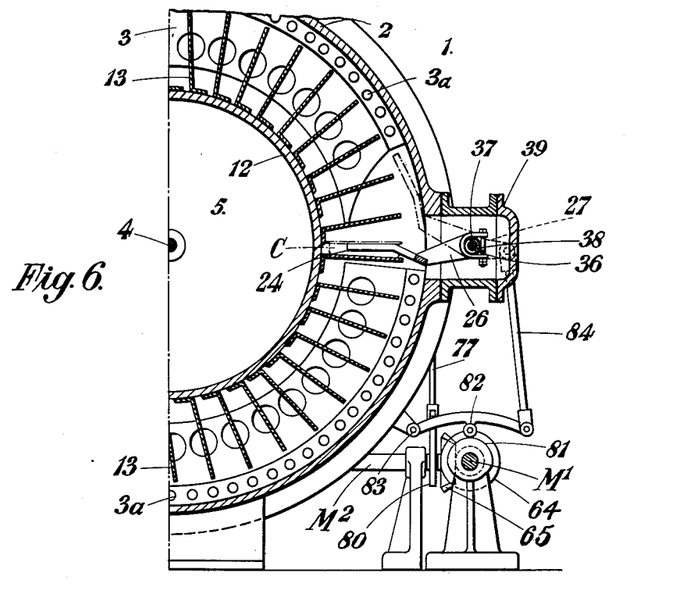
Fig. 6 is a sectional elevation taken on the line VI—VI of Fig. 3.

The wheels 5 include overhanging rims 12 on which are mounted, at suitable intervals, having in mind cans to be passed through the chamber, brackets 13 clearly indicated in Fig. 6 and as clearly shown in Fig. 3, the brackets are of a width so that they pass without hindrance between the ribs 3 of the processing chamber.

The body 2 of the chamber preferably comprises also short ribs 3a which are spaced equally in between the ribs 3.

A comparison of Figs. 3 and 6 will show that the rim 12 and its brackets 13 form in conjunction with the ribs 3 a series of cages round the several wheels 5, whilst the short ribs 3a in each cage so formed retain each can in position within the cages. It will be clear, therefore, that each wheel can at any one time be charged in each cage with a can C, and it will be noted that the wheels are fixed on the shaft 4 so that their brackets are in lateral alignment, so that between every pair of brackets there is a line of cans through the process chamber, as clearly indicated in Fig. 3.

Figure 1:
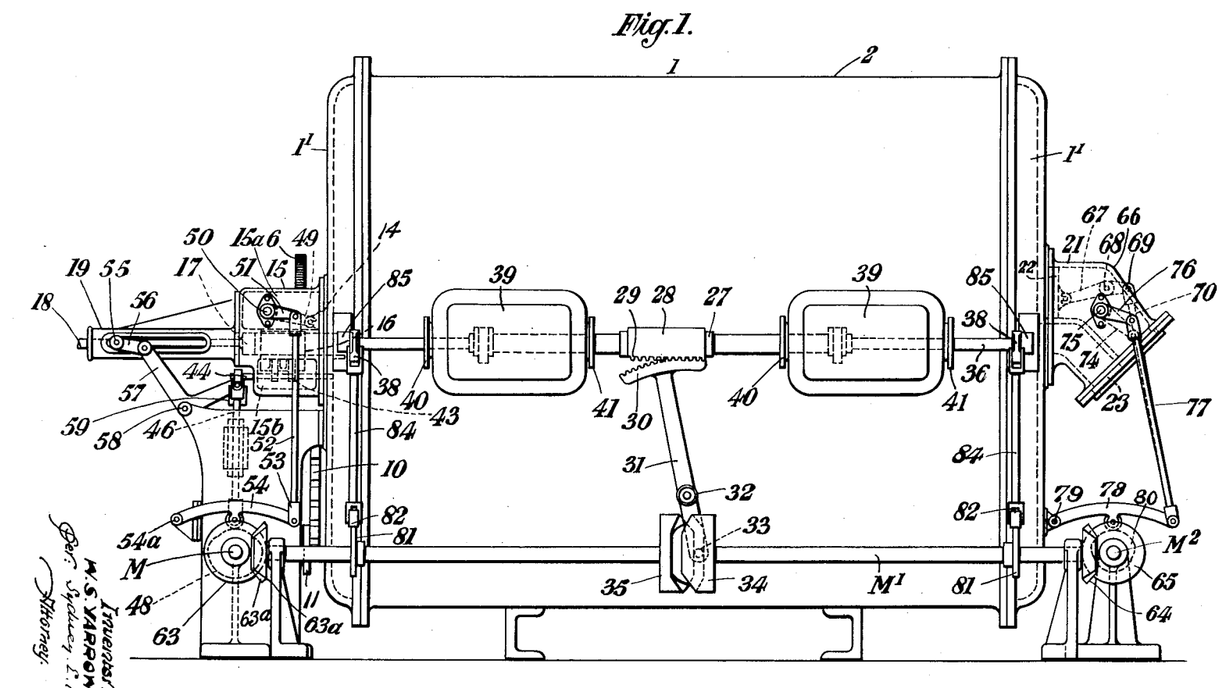
Fig. 1 is a side elevation.
Figure 2:
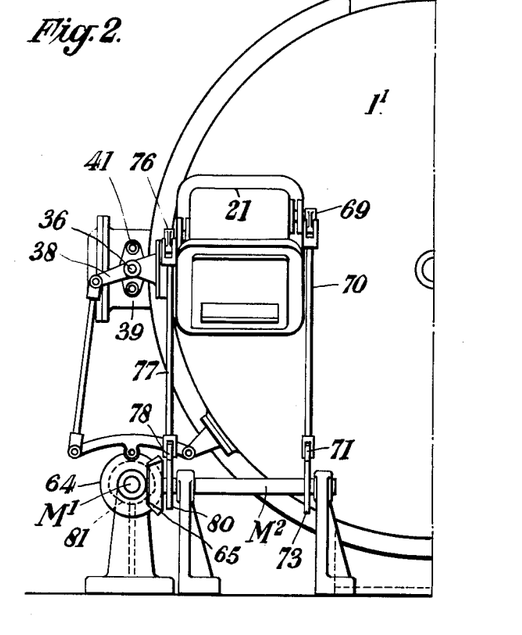
Fig. 2 is an elevation at the exit end of the machine.

On the left hand side of the process chamber as viewed in Figs. 1 and 3, a sliding gate 14 is provided to cover an inlet opening 1a for the cans into the chamber, and about the gate an enclosure 15 is formed which is in nature of a lock, and on one of the walls of the lock is formed a second sliding gate 16.

The arrangement is such that a can may be introduced into the lock by sliding the gate 16 and then returning the gate to normal position so that the can is in a complete enclosure, Then the gate 14 is lifted so that the can may be pushed into the space between two brackets on the juxtaposed wheel 5 within the process chamber.

Conveniently the charging of a can from the lock 15 to the juxtaposed wheel 5 is effected by a piston member operating in the chamber through a gland packing. Conveniently, the piston member 17 is shaped in the centre to engage a major portion of a can so that it is charged to the wheel 5 by lateral displacement only.

The piston 17 may be carried on a rod 18 guided within a tubular member 19 which may comprise packing of any suitable form at 20.

Figure 5:
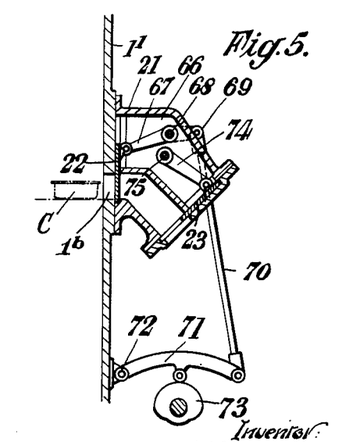
Fig. 5 is a sectional elevation taken on the line V—V of Fig. 3.

The reciprocation of a piston when a can is in the lock 15 will cause a lateral displacement of the can into the first wheel, and as all the wheels are in lateral alignment as previously described, the result is a lateral displacement of every one of the cans from one wheel to the next, and an ejection of a can from the last wheel. To prevent the egress of steam or other agent in the process chamber during the egress of a can, a lock 21 is provided of construction similar to the lock 15 previously described, and including sliding gates 22 and 23, most clearly illustrated in Fig. 5 of which the gate 22 covers the outlet opening 1b for the cans from the chamber.

The mechanical operation of the sliding gates of the locks 15 and 21 will be referred to hereafter.

To assist the accurate displacement of each can in the line opposite the lock 15 as a result of feeding a can therefrom, a forked implement is employed comprising prongs 24 which stand in the plane of the ribs 3, the latter being cut away to permit the movement of the prongs now to be referred to.

It may here be mentioned that the ribs 3 are preferably perforated members so as not to obstruct the passage of the heating agent from one end to the other of the chamber. To this end also the ribs 3a may be perforated as clearly shown in Fig. 6.

The prongs 24 of the shifting implement are carried on a bar 25 which is made in two parts, each part being connected by an arm 26 to a sleeve member 27 provided with a bushing 28 having on its underside teeth 29 clearly shown in Fig. 1, and with which meshes a segmental member 30 carried on an arm 31 pivoted at 32, the arm on the other side of the pivot to the segment 30 being provided with a pin 33 which is disposed in a cam groove 34 on a drum 35, so that as the drum 35 is rotated the arm 31 is rocked, causing a reciprocation of the bars 25 and the prongs 24. The movement of the bar 25 to the right when viewing Fig. 3 assures the lateral displacement of every one of the cans in line opposite the locks 21 and 15, and it will be clear that the complete reciprocation of the bars 25 can only be effected if the prongs are rocked out of the path of the cans, so that the return movement of the bar is perfectly free and without affecting the disposition of the cans in the wheels.

To this end the sleeve 27 to which the short arms 26 are connected is slidably mounted on a rod 36 the ends of which are supported in brackets 85 which acts as a guide for the sleeve 27 during its reciprocating movement, but the sleeve 27 is keyed to the shaft 36, as clearly indicated at 37, consequently if the shaft 36 is rocked the prongs 24 may be lifted out of the horizontal plane containing the line of cans referred to.

To this end the shaft 36 is provided with short arms 38 which are suitably actuated as hereafter referred to, to raise the prongs 24 out of the line of cans; the movement is clearly shown in Fig. 6 in which the full lines show the prongs 24 in position for causing displacement of the can, and the chain lines show the prongs rocked out of the path of the line of cans.

In order to prevent the egress of the heating or other processing agent from the chamber 1 where the operating members 26 for the prongs pass through the body 2 of the chamber, the body is cut away as clearly shown in Figs. 3 and 6, and a box 39 provided which completely houses the operating member and includes bearings 40 and 41 for the shaft 36 and sleeve 27 respectively.

Figure 4:
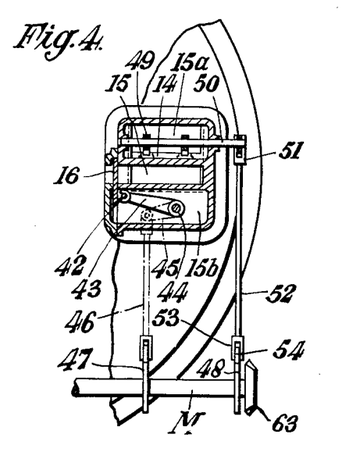
Fig. 4 is a sectional elevation taken on the line IV—IV of Fig. 3.

Considering now the construction of the locks 15 and 21 and the sliding gates therefor, and referring to Fig. 4, it will be seen that the lock 15 is comprised between housings 15a and 15b which contain the operating arms for the gates 14 and 16 respectively so that a lock proper is really sandwiched between these two housings.

To permit the entry of a can which may be gravity fed to the lock the gate 16 is dropped. To this end the gate 16 is guided within the casing comprising the housings 15a and 15b and the gate 16, and is provided with a hinged connection indicated at 42, by which it is joined to an operating arm 43 keyed to a shaft 44. This armed connection of the gate to the shaft 44 is duplicated. As clearly shown in Fig. 1, the shaft 44 is carried through the end wall of the housing 15b and is provided outside the housing with a short arm 45 shown in chain lines in Fig. 4, this arm being connected by a rod 46 to a cam member 47 mounted on the shaft M so that on the rotation of the latter the arms 45 and 43 are rocked and the gate 16 raised and lowered.

On the shaft M is also a cam member 48 which in similar manner actuates the gate 14, but the setting of the cams 47 and 48 is such that a time interval elapses, permitting the lowering and raising of the gate 16 before the gate 14 is raised, whilst the latter is closed again before the gate 16 is again lowered.

The operation of the gate 14 from the cam 48 is effected through the agency of the duplicate arms 49 keyed on a shaft 50 mounted in the housing 15a, which passes through the side wall of the housing 15a as clearly shown in Figs. 3 and 4, and outside the housing is provided a short arm 51 hingedly connected to a rod 52 in turn hingedly connected at 53 to a rocker 54 pivoted at 54a (see particularly Figs. 1 and 3), and operated by the cam 48.

It is convenient now to refer to the operation of the piston 17 which operates after the gate 16 has been lowered and closed again, and simultaneously with the opening of the gate 14.

The piston rod 18 is provided with a pin 55, see Figs. 1 and 3, which is provided with a link 56 connected to a bell crank 57 pivoted at 58, the other arm of which is connected at 59 to a rod 60 actuated from a cam 61 in similar manner as the gate 16 is operated, though obviously a crank could be employed in shaft M for this purpose.

The cam 61 is set on the shaft M relatively to the cam 47 to attain the desired timing of operation.

As the feeding of a can by the piston 17 to the first wheel 5 occurs simultaneously with ejection of a can from the last wheel into the lock 21 at the exit end, the operation of the sliding gate thereof is timed so it is lifted at the same time as the gate 14 of the lock 15. To this end the shaft M is provided with bevel gears 63 and 63a by which the movement of the shaft M is transferred by bevels 63a to the transmission shaft M1 on which the latter gear is mounted, the other end of the shaft M1 being provided with a bevel pair 64, 65, by which the movement of the shaft M1 is transmitted to shaft M2 which carries the cams for operating the gates of the lock 21.

As clearly shown in Figs. 1, 2, 3, and 5, the lock 21 is comprised in a casting which includes the lock 21 and a housing 66 for the operating gear of the gates 22 and 23; when the gate 22 is lifted a can C moves into the lock 21 and falls on the gate 23, on the retraction of which it leaves the lock and is conveyed away by any suitable means.

The operation of the gate 22 is effected through arms 67 mounted on a shaft 68 carried in the housing 66 and extending through the side wall thereof, being provided on the outside of the housing with an arm 69 which is connected by a rod 70 to a rocker 71 pivoted at 72 and actuated from a cam 73 on the shaft M2, whilst the gate 23 is provided with an arm 74 fixed to a shaft 75 mounted in the housing 66 and provided outside the housing as clearly shown in Figs. 1 and 3, with an arm 76 which is connected by a rod 77 to a rocker 78 pivoted at 79 and actuated by a cam 80 clearly indicated in Fig. 1.

From the foregoing it will be seen that the operation of the gate 23 is effected through mechanism identical with that which effects the movements of the gate 22. The settings of the cams 73 and 80 are such that the gate 22 opens when the gate 14 of the inlet lock is opened, and so that the gate 23 is not moved until the gate 22 is again closed.

Referring now to the shifting implement for assuring the movement of the cans through the chamber when a can is fed by the piston 17 to the lock 15. It has already been explained that the shifting implement is reciprocated by the agency of the drum 35, see Fig. 1, this drum 35 is mounted on the shaft M1 which is connected by the bevels 63 and 63a, see Fig. 3, to the shaft M.

On the shaft M1 as clearly shown in Figs. 1 and 6, are mounted cam members 81 which actuate rockers 82 pivoted at 83 to the body of the process chamber, the rocker 82 being connected by a rod 84 to an arm 38 mounted on the shaft 36 as clearly shown in Figs. 3 and 6.

For convenience of operation this actuating means for rocking the shaft 36 is duplicated, one at each end of the shaft as clearly shown in Figs. 1 and 3.

In Fig. 3 the bearings for the shaft 37 are indicated at 85 being comprised in brackets carried by the end walls 1' of the process chamber.

From the foregoing it will be understood that by rotation of the shaft M1 the rocker arm is actuated and the prongs 24 rocked through the limits shown in Fig. 6.

The cam 81 is set on the shaft M1 so as to lift the prongs to the chain line position shown in Fig. 6, at the end of the traverse of the prongs, causing the lateral displacement of the cans in the wheels 5.

As the operation of the gates of the lock 15 is effected from cams on the constantly running shaft M, and the gates on the lock 21 are operated by cams on the shaft M2, and the shafts M and M2 are connected by a shaft M1, it will be clear that there is a synchronism of the movements of the gates, and as the shaft M1 controls also the movement of the drum 35 and also the rocking of the prongs through the agency of the cams 81, that the movement of the shifting implement is in synchronism with the movement of the gates.

The shaft M is also geared to the wheels 5 of the process chamber through the Geneva stop mechanism, as clearly shown in Fig. 7, so that the gates of the locks and the shifting implement are also operated synchronously with the step by step movement of the wheels, the wheels being fixed by the Geneva stop mechanism during a feeding operation.

An apparatus as hereinbefore described assures the complete traverse of a can around each wheel, and then its displacement to the next and around that wheel, and so on, throughout the chamber, thereby each can has exactly the same period of treatment and is subjected to exactly the same conditions, and moreover, the treatment is uniform throughout the chamber thereby bursts are entirely eliminated.

Although the apparatus is designed for dealing especially with oval cans, clearly the machine can deal with any shape of can including cylindrical, and obtains the advantage that the cans are not agitated, there being complete absence of any rolling motion of the container.

There is merely the relatively slow step by step movement of a can in which the vertical plane is constituted by a wheel and then a lateral displacement, and so on.

Figure 9:
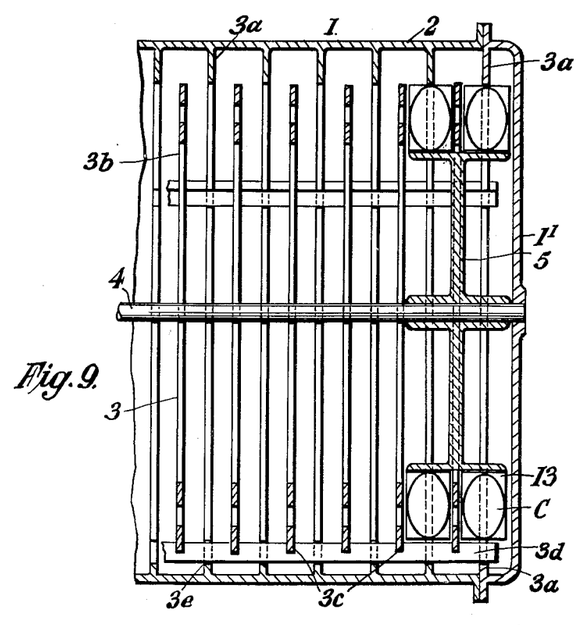
Figure 10:
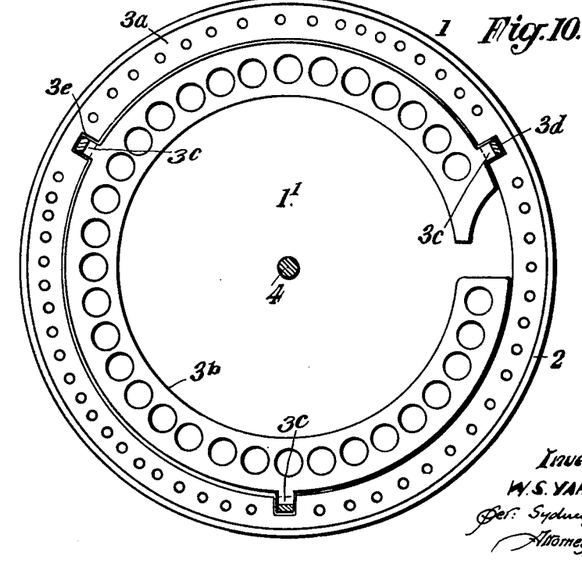

The construction of the apparatus hereinbefore described can be varied in many ways without departing from the spirit of the invention, for instance, instead of the ribs 3 being formed integrally with the body of the chamber, rib members in the form of rings 3b arranged alternately with the wheels may be employed as indicated in Figs. 9 and 10, the external diameter of these rings being less than the internal diameter of the rings constituting the retaining 3a, thereby the axis 4 of the wheels and the substitutes for the ribs 3 threaded thereon may be introduced collectively into the processing chamber. To prevent a relative movement between these rings 3b they are preferably provided with external tongues 3c preferably three in number (see Fig. 10) and the tongues of each ring are introduced into three notched bars 3d, the ribs 3a being notched as indicated at 3e for the passage of the bar and lugs aforesaid.

In such an arrangement the bars are locked by the retaining ribs 3a which in turn retain the relative setting of the rings forming the substitutes for the ribs 3.

In such an arrangement it will be noticed there is a tortuous path between the ribs 3a and the rings 3b at the periphery of the chamber, hence there is no baffling of the gases which are free to move about within the chamber and equally attack the whole area of the articles subjected to the treatment.

Further, although the apparatus is described for a heat treatment such as cooking for canned foods the chamber may also be used for other treatments such as the cooling by water under pressure of previously processed cans or to the degreasing of articles such as small castings; in this case the chamber will be charged with a vapour of, for example, trichlorethylene, and the articles will be traversed through the chamber being cleaned by the vapour condensing the articles.

In such form of construction the bottom of the chamber may form a well or the like from which the vapour is derived by applying heat, for instance by jacketing the chamber at the bottom or by externally heating as well understood in the art. In such an arrangement the locks are particularly useful for preventing loss of the vapour, and the exit of the vapour may be additionally prevented by jacketing the locks for circulation of a cooling medium such as cold water.

What I claim is:

1. Apparatus for processing articles having in combination a closed cylindrical chamber provided with an inlet and an outlet for the articles to be treated, a rotatable drum member in said chamber, a plurality of brackets on the external periphery of the drum member to form a plurality of channels parellel with the axis of the drum member, a plurality of spaced locating ribs on the internal periphery of the chamber disposed to intersect the channels to form a plurality of peripheral series of cages laterally aligned on the drum member for the articles during treatment, a gap in each of the ribs aligned with the inlet and the outlet of the chamber to form an uninterrupted passage laterally through a series of cages when the drum member is at rest, and gearing for rotating the drum member step by step to bring the laterally aligned cages successively into registered location with the inlet and outlet of the chamber with a period of rest at each step for the introduction of an article to be treated through the inlet into a cage on the drum member and the discharge of an article simultaneously through the outlet from a cage on the drum member.

2. Apparatus for processing articles having in combination a closed cylindrical chamber provided with an inlet and an outlet for the articles to be treated, a rotatable drum member in said chamber, a plurality of brackets on the external periphery of the drum member to form a plurality of channels parallel with the axis of the drum member, a plurality of spaced locating ribs on the internal periphery of the chamber disposed to intersect the channels to form a plurality of peripheral series of cages laterally aligned on the drum member for the articles during treatment, a gap in each of the ribs aligned with the inlet and the outlet of the chamber to form an uninterrupted passage laterally through a series of cages when the drum member is at rest, gearing for rotating the drum member step by step to bring the laterally aligned cages successively into registered location with the inlet and outlet of the chamber with a period of rest at each step for the introduction of an article to be treated through the inlet into a cage on the drum member and the discharge of an article simultaneously through the outlet from a cage on the drum member, an intermittently actuated conveying mechanism for displacing the articles in a set of laterally aligned cages when the drum member is at rest from one peripheral series of cages to the next peripheral series of cages and discharging an article from the last peripheral series of cages through the outlet of the chamber, and intermittently actuated feeding mechanism for introducing an article to be treated into the first peripheral series of cages through the inlet of the chamber when the drum member is at rest.

3. Apparatus for processing articles having in combination a closed cylindrical chamber provided with an inlet and an outlet for the articles to be treated, a rotatable drum member in said chamber, a plurality of brackets on the external periphery of the drum member to form a plurality of channels parallel with the axis of the drum member, a plurality of spaced locating ribs on the internal periphery of the chamber disposed to intersect the channels to form a plurality of peripheral series of cages laterally aligned on the drum member for the articles during treatment, a gap in each of the ribs aligned with the inlet and the outlet of the chamber to form an uninterrupted passage laterally through a series of cages when the drum member is at rest, gearing for rotating the drum member step by step to bring the laterally aligned cages successively into registered location with the inlet and the outlet of the chamber with a period of rest at each step for the introduction of an article to be treated through the inlet into a cage on the drum member and the discharge of an article simultaneously through the outlet from a cage on the drum member, an intermittently actuated element having prongs spaced according to the ribs of the chamber for engaging each of the articles in the passage simultaneouly when the drum is at rest to displace the articles laterally to the cage of the next peripheral series and discharge the article in the cage of the last peripheral series, and intermittently actuated feeding mechanism for introducing an article to be treated into the first peripheral series of cages through the inlet of the chamber when the drum is at rest.

4. Apparatus for processing articles having in combination a closed cylindrical chamber provided with an inlet and an outlet for the articles to be treated, a rotatable drum member in said chamber, a plurality of brackets on the external periphery of the drum member to form a plurality of channels parallel with the axis of the drum member, a plurality of spaced locating ribs on the internal periphery of the chamber disposed to intersect the channels to form a plurality of peripheral series of cages laterally aligned on the drum member for the articles during treatment, a gap in each of the ribs aligned with the inlet and the outlet of the chamber to form an uninterrupted passage laterally through a series of cages when the drum member is at rest, Geneva stop mechanism for rotating the drum member step by step to bring the laterally aligned cages successively into registered location with the inlet and the outlet of the chamber and lock the drum in position temporarily at each step for the introduction of an article to be treated through the inlet into a cage on the drum member and the discharge of an article simultaneously through the outlet of the chamber from a cage on the drum member, an intermittently actuated conveying mechanism for displacing the articles in a set of laterally aligned cages when the drum member is locked from one peripheral series of cages to the next peripheral series of cages and discharging an article from the last peripheral series of cages through the outlet of the chamber, and intermittently actuated feeding mechanism for introducing an article to be treated into the first peripheral series of cages through the inlet of the chamber when the drum member is locked.

5. Apparatus for processing articles comprising in combination a treating chamber, spaced internal locating ribs in said chamber, short ribs intermediate to said locating ribs, a plurality of wheels in said chamber to form a drum member, rims on said wheels in juxtaposed relation, brackets on said rims, laterally aligned peripheral series of cages formed by the brackets on said rims for the reception of articles to be processed located by said ribs, and retained by said short ribs, and means for laterally displacing articles contained in the cages from one wheel to the next, whereby the articles pass from one end of the chamber to the other.

6. Apparatus for processing articles comprising in combination a cylindrical chamber, an inlet at one end of said chamber and an outlet in alignment with said inlet at the opposite end, spaced internal locating ribs in said chamber cut away along the line joining said inlet and outlet, a plurality of wheels in said chamber to form a drum member, rims on said wheels in juxtaposed relation, brackets on said rims, laterally aligned peripheral series of cages formed by the brackets on said rims for the reception of articles to be processed, and means operating on the line joining the inlet and outlet to displace the articles contained in the cages, whereby the articles pass from one end of the chamber to the other.

7. Apparatus for processing articles comprising in combination a cylindrical treating chamber, an inlet at one end of said chamber and an outlet in alignment with said inlet at the opposite end, spaced internal locating ribs in said chamber cut away along the line joining said inlet and outlet, a plurality of wheels in said chamber to form a drum member, rims on said wheels in juxtaposed relation, brackets on said rims, laterally aligned peripheral series of cages formed by the brackets on said rims for the reception of articles to be processed, means for introducing articles into the chamber through the inlet and means for simultaneously operating on the line joining the inlet and outlet to displace the articles contained in the cages, whereby the articles pass from one end of the chamber to the other.

8. Apparatus for processing articles comprising in combination a cylindrical treating chamber, spaced internal locating ribs in said chamber, a plurality of wheels in said chamber to form a drum member, rims on said wheels in juxtaposed relation, brackets on said rims, laterally aligned peripheral series of cages formed by the brackets on said rims for the reception of articles to be processed located by said ribs, a series of transversely movable prongs engaging said articles, and means for reciprocating said prongs to laterally displace articles contained in the cages from one wheel to the next, whereby the articles pass from one end of the chamber to the other.

9. Apparatus for processing articles comprising in combination a cylindrical treating chamber, spaced internal locating ribs in said chamber, a plurality of wheels in said chamber to form a drum member, rims on said wheels in juxtaposed relation, brackets on said rims, laterally aligned peripheral series of cages formed by the brackets on said rims for the reception of articles to be processed located by said ribs, a series of transversely movable prongs engaging said articles, and means to rock the prongs so that they clear the articles before returning to pristine position, whereby the articles pass from one end of the chamber to the other.

10. Apparatus for processing articles comprising in combination a cylindrical treating chamber, an inlet at one end of said chamber and an outlet in alignment with said inlet at the opposite end, spaced internal locating ribs in said chamber cut away along the line joining said inlet and outlet, a plurality of wheels in said chamber to form a drum member, rims on said wheels in juxtaposed relation, brackets on said rims, laterally aligned peripheral series of cages formed by the brackets on said rims for the reception of articles to be processed, a piston feeding the articles to said inlet through a lock without loss of treating medium, and means for simultaneously operating on the line joining the inlet and outlet to displace the articles contained in the cages, whereby the articles pass from one end of the chamber to the other.

11. Apparatus for processing articles comprising in combination a cylindrical treating chamber, spaced internal locating ribs in said chamber, a plurality of wheels in said chamber to form a drum member, rims on said wheels in juxtaposed relation, brackets on said rims, laterally aligned peripheral series of cages formed by the brackets on said rims for the reception of articles to be processed located by said ribs, a series of transversely movable prongs engaging said articles, means to rock the prongs so that they clear the articles before returning to pristine position, and an outlet lock through which the articles are ejected from the chamber.

12. Apparatus for processing articles comprising in combination a cylindrical treating chamber, an inlet at one end of said chamber and an outlet in alignment with said inlet at the opposite end, spaced internal locating ribs in said chamber cut away along the line joining said inlet and outlet, a plurality of wheels in said chamber to form a drum member, rims on said wheels in juxtaposed relation, brackets on said rims, laterally aligned peripheral series of cages formed by the brackets on said rims for the reception or articles to be processed, Geneva stop mechanism imparting a step by step rotation to said wheels, means for feeding articles to said inlet in the intervals between the steps and synchronized means operating on the line joining the inlet and outlet to displace articles contained in the cages, whereby the articles pass from one end of the chamber to the other and are ultimately ejected through said outlet.

13. Apparatus for processing articles comprising in combination a cylindrical treating chamber, an inlet at one end of said chamber and an outlet in alignment with said inlet at the opposite end, spaced internal locating ribs in said chamber cut away along the line joining said inlet and outlet, a plurality of wheels in said chamber to form a drum member, rims on said wheels in juxtaposed relation, brackets on said rims, laterally aligned peripheral series of cages formed by the brackets on said rims for the reception of articles to be processed, locks to said inlet and outlet preventing escape of treating medium during passage of an article, Geneva stop mechanism imparting a step by step rotation to said wheels, means for feeding articles to said inlet in the intervals between the steps, and synchronized means operating on the line joining the inlet and outlet to displace articles contained in the cages, whereby the articles pass from one end of the chamber to the other and are ultimately ejected through the outlet.

14. Apparatus for processing articles comprising in combination a cylindrical treating chamber, an inlet at one end of said chamber and an outlet in alignment with said inlet at the opposite end, spaced internal locating ribs in said chamber cut away along the line joining said inlet and outlet, a plurality of wheels in said chamber to form a drum member, rims on said wheels in juxtaposed relation, brackets on said rims, laterally aligned peripheral series of cages formed by the brackets on said rims for the reception of articles to be processed, Geneva stop mechanism imparting a step by step rotation to said wheels, a series of transverse movable prongs engaging said articles, and synchronized means for reciprocating said prongs between the steps to laterally displace articles contained in the cages, whereby the articles pass from one end of the chamber to the other.

In testimony whereof I affix my signature.
WILLIAM SYDNEY YARROW.